(12) United States Patent
Ro et al.

(10) Patent No.: US 9,681,445 B2
(45) Date of Patent: Jun. 13, 2017

(54) METHOD AND DEVICE FOR MONITORING FREQUENCY DOMAIN-BASED WIRELESS LINK IN WIRELESS COMMUNICATION SYSTEM

(71) Applicant: Samsung Electronics Co., Ltd., Suwon-si, Gyeonggi-do (KR)

(72) Inventors: Sang Min Ro, Seoul (KR); Young Bum Kim, Seoul (KR); Joon Young Cho, Suwon-si (KR); Hyoung Ju Ji, Seoul (KR); Seung Hoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 14/349,485

(22) PCT Filed: Oct. 26, 2012

(86) PCT No.: PCT/KR2012/008883
§ 371 (c)(1),
(2) Date: Apr. 3, 2014

(87) PCT Pub. No.: WO2013/062367
PCT Pub. Date: May 2, 2013

(65) Prior Publication Data
US 2014/0247800 A1  Sep. 4, 2014

(30) Foreign Application Priority Data
Oct. 26, 2011 (KR) .................. 10-2011-0109753

(51) Int. Cl.
*H04J 1/16* (2006.01)
*H04W 72/04* (2009.01)
(Continued)

(52) U.S. Cl.
CPC ......... *H04W 72/0453* (2013.01); *H04L 5/006* (2013.01); *H04W 24/08* (2013.01); *H04L 1/0026* (2013.01); *H04L 1/1671* (2013.01)

(58) Field of Classification Search
CPC ........ H04B 17/15; H04B 17/17; H04B 17/18; H04B 17/24; H04B 17/26; H04B 17/29;
(Continued)

(56) References Cited

U.S. PATENT DOCUMENTS

| 2007/0098098 | A1* | 5/2007 | Xiao .................. H04L 1/0026 375/260 |
| 2011/0075628 | A1* | 3/2011 | Cho .................. H04W 72/0413 370/329 |
| 2011/0080968 | A1* | 4/2011 | Seo ..................... H04B 7/0417 375/267 |

FOREIGN PATENT DOCUMENTS

| KR | 10-2008-0089488 A | 10/2008 |
| KR | 10-2009-0008330 A | 1/2009 |

(Continued)

OTHER PUBLICATIONS

Qualcomm Europe, Out of Sync Handling at UE in DC-HSUPA, 3GPP TSG RAN WG1 Meeting #57bis, R1-092626, Jun. 29-Jul. 3, 2009, Los Angeles, CA, USA.

*Primary Examiner* — Alvin Zhu
(74) *Attorney, Agent, or Firm* — Jefferson IP Law, LLP

(57) ABSTRACT

The present disclosure relates to a technique for radio link monitoring in a wireless communication system, and to operation procedures of the base station and user equipment and a method for radio link quality evaluation on the basis of the technique. In the method, the user equipment divides the downlink channel bandwidth into multiple frequency ranges, measures channel states for each frequency range, and evaluates the radio link quality based on channel state measurement results. Thereafter, the user equipment sends
(Continued)

frequency range quality information to the base station, which may then utilize the same for downlink resource allocation. Hence, it is possible to solve the problem of the existing scheme wherein the user equipment enters the physical layer problem detection state or the radio link failure state although a frequency range usable for service provisioning is present within the downlink channel bandwidth.

14 Claims, 12 Drawing Sheets

(51) Int. Cl.
*H04W 24/08* (2009.01)
*H04L 5/00* (2006.01)
*H04L 1/16* (2006.01)
*H04L 1/00* (2006.01)

(58) Field of Classification Search
CPC .. H04B 17/309; H04B 17/318; H04B 17/373; H04B 17/382; H04B 17/391
See application file for complete search history.

(56) References Cited

FOREIGN PATENT DOCUMENTS

| KR | 10-2011-0090645 A | 8/2011 |
|---|---|---|
| WO | 2011/100627 A1 | 8/2011 |

* cited by examiner

METHOD AND DEVICE FOR MONITORING FREQUENCY DOMAIN-BASED WIRELESS LINK IN WIRELESS COMMUNICATION SYSTEM

TECHNICAL FIELD

The present disclosure relates to a wireless communication system. More particularly, the present disclosure relates to a technique for radio link monitoring, and to operation procedures of a base station and user equipment and a method for radio link quality evaluation on the basis of the technique.

BACKGROUND ART

In a wireless communication system, a user equipment performs radio link monitoring by measuring the state of a downlink channel connected to the current base station, evaluating the downlink quality based on measurement results, and determining whether the downlink channel is able to provide a reliable level of service. As a representative example, the Long Term Evolution (LTE) system, which is developed as a next generation mobile communication system by the 3rd Generation Partnership Project (3GPP), a standardization body for asynchronous cellular mobile communication, specifies that a user equipment should evaluate downlink quality by measuring a common reference signal (CRS) transmitted on downlink from a corresponding base station for radio link monitoring. Here, reference signals that a user equipment may receive on the downlink of the LTE system may include the CRS described above, channel state information reference signal (CSI-RS), and demodulation reference signal (DMRS).

To evaluate radio link quality, the user equipment performs CRS-based measurement for a given time, filters measurement values, and compares the filtered results with preset thresholds. Here, the threshold is defined as the signal level corresponding to a given block error rate (BLER) of a Physical Downlink Control Channel (PDCCH) transmission distributed over the entire downlink channel bandwidth. In the current specification, the threshold Q_out is defined as the level corresponding to a block error rate of 10 percent, and the threshold Q_in is defined as the level corresponding to a block error rate of 2 percent. The user equipment sets thresholds Q_out and Q_in respectively to the levels corresponding to the given block error rates of a hypothetical PDCCH transmission taking into account Physical Control Format Indicator Channel (PCFICH) errors, and compares the estimated level with the thresholds.

When the level of the estimated radio link quality is lower than the threshold Q_out, the current radio link quality is evaluated as "out-of-sync"; and when the level of the estimated radio link quality is higher than the threshold Q_in, the current radio link quality is evaluated as "in-sync". "Out-of-sync" indicates that the current downlink state is not reliable, and "in-sync" indicates that the current downlink state is reliable. According to evaluation results, the physical layer of the user equipment sends either an out-of-sync indication or an in-sync indication to the higher layers.

When the out-of-sync indication occurs consecutively a given number of times or more, the higher layer of the user equipment detects a downlink quality error and switches to a physical layer problem detection state, in which a corresponding timer is started. When the user equipment does not recover from the physical layer problem detection state before the timer expires, radio link failure is declared. When the in-sync indication occurs consecutively a given number of times or more at the physical layer before the timer expires, the user equipment recovers the normal state from the physical layer problem detection state.

In 3GPP Release 11 currently under standardization, it is proposed to introduce a new carrier type without CRS transmission. Hence, the existing CRS-based scheme for radio link monitoring may no longer be applicable.

In particular, for a carrier of the new type, it is highly probable to configure data and control channels through frequency division multiplexing (FDM). Hence, it may be possible to provide a downlink service to a user equipment even when only a frequency range within the downlink channel bandwidth on a carrier of the new type exhibits a reliable level of quality.

In such a situation, when Q_out and Q_in are defined with reference to given block error rates of a hypothetical PDCCH transmission distributed over the overall downlink channel bandwidth as in the conventional manner, if the average quality of the overall downlink channel bandwidth is lower than Q_out, the radio link quality would be evaluated as out-of-sync although a frequency range within the downlink channel bandwidth exhibits a level of quality sufficient to maintain a downlink service. Likewise, although a frequency range within the downlink channel bandwidth exhibits a level of quality evaluating to in-sync, the radio link quality would not be evaluated as in-sync because the average quality of the overall downlink channel bandwidth is lower than Q_out.

For example, in the event that the existing radio link quality evaluation scheme is applied to the new carrier type, a situation may arise as shown FIG. 1 wherein Q_out is set as indicated by indicia 100 and the average quality of the overall downlink channel bandwidth is estimated by the user equipment as indicated by indicia 101. Here, although frequency ranges which exhibit a level of channel quality higher than Q_out and are usable for allocating control and data channels are present within the downlink channel bandwidth as indicated by indicia 102, the user equipment will evaluate the current radio link quality to out-of-sync.

A user equipment residing at a cell edge where the average level of quality of the overall downlink channel bandwidth is close to the threshold is highly likely to encounter the above situation. Thereby, although it is possible for the user equipment to receive a service from the current cell, the user equipment may perform an undesired operation such as conducting unnecessary handover to a neighbor cell, entering the physical layer problem detection state, or entering the radio link failure state.

Hence, it is necessary to develop a new technique that can solve the above problems and support smooth radio link monitoring.

DISCLOSURE OF INVENTION

Technical Problem

Aspects of the present disclosure are to address the above mentioned problems. Accordingly, an aspect of the present disclosure is to provide a method and device that enable a user equipment conducting radio link monitoring in a wireless communication system to evaluate the radio link quality for one or more frequency ranges divided within the overall downlink channel bandwidth.

Another aspect of the present disclosure is to provide a method and device that enable the user equipment to send information on the quality of the frequency ranges to a base station through the uplink and enable the base station to allocate control and data channels to the user equipment on the basis of the received quality information.

Solution to Problem

According to a first aspect of the present disclosure, in a wireless communication system, the user equipment measures and evaluates channel states for each of one or more frequency ranges divided within the downlink channel bandwidth.

According to a second aspect of the present disclosure, the user equipment performs radio link monitoring by evaluating the radio link quality to in-sync or out-of-sync on the basis of channel state measurement results obtained for the individual frequency ranges.

According to a third aspect of the present disclosure, the user equipment sends an uplink resource allocation request such as a scheduling request or a random access preamble to the base station, and sends frequency range quality information obtained through radio link quality evaluation to the base station through uplink resources allocated by the base station.

According to a fourth aspect of the present disclosure, the base station allocates downlink control and data channels to the user equipment on the basis of the frequency range quality information received from the user equipment.

According to a fifth aspect of the present disclosure, after sending a request for uplink resource allocation to be used to transmit frequency range quality information, if uplink resource allocation information is not received from the base station, the user equipment performs radio link quality evaluation for the overall downlink channel bandwidth.

According to a sixth aspect of the present disclosure, after quality evaluation for individual frequency ranges, when the quality of all the frequency ranges is either reliable or unreliable, the user equipment does not send the frequency range quality information through the uplink channel.

More specifically, in accordance with an aspect of the present disclosure, a method of radio link monitoring for a user equipment in a wireless communication system is provided. The method may include: dividing the downlink channel bandwidth into multiple frequency ranges for radio link monitoring; measuring channel states for each frequency range; and evaluating the radio link quality to in-sync or out-of-sync on the basis of channel state measurement results.

In accordance with another aspect of the present disclosure, a user equipment conducting radio link monitoring in a wireless communication system is provided. The user equipment may include: a transceiver unit to send and receive signals to and from a base station; a channel measurement unit to divide the downlink channel bandwidth into multiple frequency ranges for radio link monitoring and to measure channel states for each frequency range; and a radio link quality evaluator to evaluate the radio link quality to in-sync or out-of-sync on the basis of channel state measurement results.

Advantageous Effects of Invention

In a feature of the present disclosure, a user equipment may evaluate the radio link quality for one or more frequency ranges divided within the overall downlink channel bandwidth and send information on the quality of the frequency ranges to a base station. The base station may use the received quality information to allocate control and data channels to the user equipment.

Hence, it is possible to solve the problem, which may be caused by the existing scheme for radio link monitoring, wherein the user equipment enters the physical layer problem detection state or the radio link failure state although a frequency range usable for service provisioning is present within the downlink channel bandwidth. In addition, when a frequency range usable for service provisioning is present within the downlink channel bandwidth, it is possible to effectively utilize such a frequency range and prevent the user equipment from conducting unnecessary handover.

MODE FOR THE INVENTION

Figure 1:
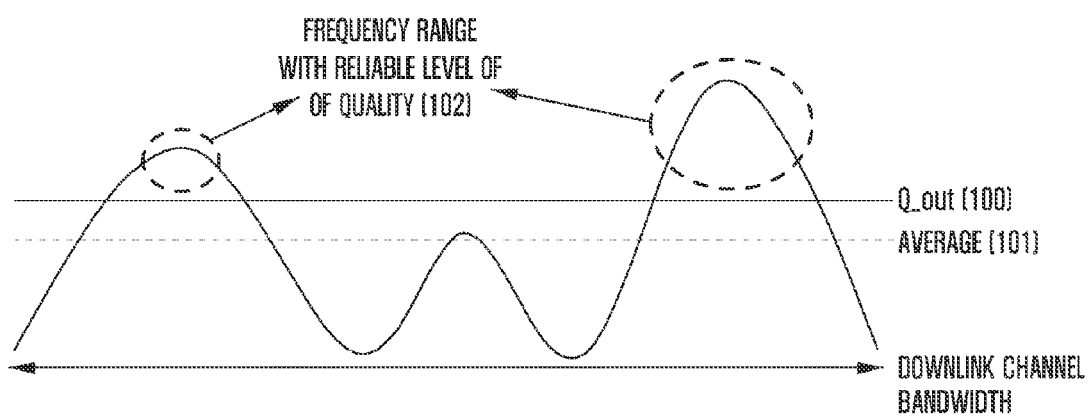
FIG. 1 illustrates a problem that may arise when an existing scheme for radio link monitoring is utilized.

Hereinafter, exemplary embodiments of the present disclosure are described in detail with reference to the accompanying drawings. Detailed descriptions of well-known functions and structures incorporated herein may be omitted to avoid obscuring the subject matter of the present disclosure. Particular terms may be defined to describe the present disclosure in the best manner. Accordingly, the meaning of specific terms or words used in the specification and the claims should be construed in accordance with the spirit of the present disclosure.

Next, a description is given of radio link monitoring performed by a user equipment on the basis of one or more frequency ranges divided within the downlink channel bandwidth, an operation procedure between the base station and user equipment, and evaluation of radio link quality.

In the present disclosure, the base station uses a new carrier type and performs not only downlink data channel transmission but also downlink control channel transmission through frequency division multiplexing (FDM). Reference signals that a user equipment may use for radio link monitoring may include the common reference signal (CRS) and channel state information reference signal (CSI-RS). In embodiments of the present disclosure, it is assumed that the CRS is not transmitted when the new carrier type is used. Hence, the user equipment uses results of measurement based on the CSI-RS to perform radio link monitoring. However, the present disclosure is not limited to utilization of the CSI-RS, and another reference signal such as the CRS may also be used.

In the present disclosure, for radio link monitoring, the downlink channel bandwidth is divided into one or more frequency ranges. To this end, the base station notifies the user equipment of configuration of the divided frequency ranges. Here, frequency range configuration information may be sent from the base station to the user equipment through RRC signaling, and the configuration information may include information regarding sizes of divided frequency ranges, the number thereof, and positions in frequencies thereof. The user equipment measures the channel state for each frequency range, and performs quality evaluation for each frequency range on the basis of channel state measurement results. Then, the user equipment evaluates radio link quality to either out-of-sync (or poor) or in-sync (or normal) on the basis of quality evaluation results for individual frequency ranges. The user equipment sends frequency range quality information derived from evaluation of radio link quality to the base station. After reception of the frequency range quality information, the base station utilizes the frequency range quality information to allocate data and control channels to the user equipment.

Configuration information regarding one or more frequency ranges divided within the downlink channel bandwidth for radio link monitoring, such as sizes of the frequency ranges and the number thereof, may be determined by the base station and the user equipment may be notified thereof through Radio Resource Control (RRC) signaling or other signaling. Configuration information regarding frequency ranges divided within the downlink channel bandwidth for radio link monitoring may also be agreed upon between the base station and user equipment in advance without separate signaling for frequency range configuration. Alternatively, the user equipment may determine to configure divided frequency ranges within the downlink channel bandwidth and notify the base station of the determination. The criteria for configuring frequency ranges may include the downlink channel bandwidth, uplink channel bandwidth, traffic load of the base station, base station type, and user equipment type. Other factors may also be considered.

When the base station supports multi-carrier transmission such as carrier aggregation (CA), frequency ranges for radio link monitoring may be configured not only in the downlink channel bandwidth of one carrier but also in the entire downlink channel bandwidth of multiple aggregated carriers. For example, if N carriers are available for CA, the base station may configure N frequency ranges so that each frequency range corresponds to the downlink channel bandwidth of one carrier. The base station may also configure settings so that radio link monitoring is performed only on the downlink channel bandwidth of a part of the N carriers. Here, a unit frequency range may be flexibly configured so that the size thereof corresponds to the whole or a portion of the downlink channel bandwidth of one carrier. The sizes and number of unit frequency ranges may also be configured differently carrier-by-carrier.

In embodiments, the frequency range quality information may include information on at least one frequency range exhibiting a reliable level of quality or information on at least one frequency range exhibiting an unreliable level of quality. Alternatively, the frequency range quality information may include information representing individual quality values of one or more frequency ranges. Here, quality values may be represented as absolute values or as differences with respect to a given reference value. As described before, the frequency range quality information may be utilized to allocate control and data channels to the corresponding user equipment.

In the present disclosure, the user equipment performs radio link quality evaluation separately for one or more frequency ranges divided within the downlink channel bandwidth for radio link monitoring.

Figure 2:
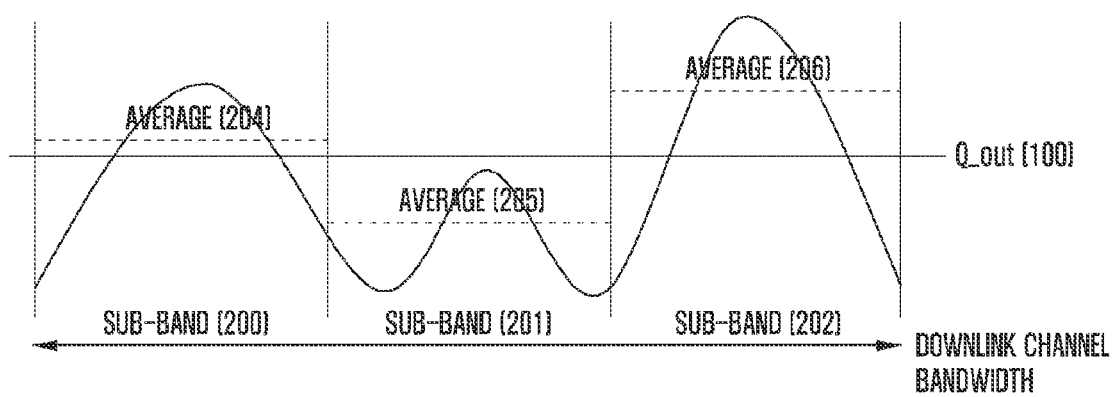
FIG. 2 illustrates a scheme for dividing the downlink channel bandwidth into one or more frequency ranges to conduct radio link monitoring in a wireless communication system according to an embodiment of the present disclosure.

FIG. 2 illustrates a scheme for dividing the downlink channel bandwidth into one or more frequency ranges to conduct radio link monitoring in a wireless communication system according to an embodiment of the present disclosure.

Referring to FIG. 2, the downlink channel bandwidth is divided into three frequency ranges (sub-bands) and the three frequency ranges are represented respectively as Sub-band 0, Sub-band 1 and Sub-band 2 as indicated by indicia 200, 201 and 202.

To conduct radio link quality evaluation, for each frequency range divided as shown in FIG. 2, the user equipment computes an average level for the frequency range using channel state measurement values based on the CSI-RS contained in the frequency range, filters the average level, and compares the filtered average level with the threshold Q_out 203 (or the first reference value).

It can be seen that the average level 204 for Sub-band 0 (200) is higher than Q_out 203, the average level 205 for Sub-band 1 (201) is lower than Q_out 203, and the average level 206 for Sub-band 2 (202) is higher than Q_out 203. That is, while the frequency range indicated by Sub-band 1 (201) exhibits an unreliable level of quality, the quality levels of the frequency ranges indicated by Sub-band 0 (200) and Sub-band 2 (202) are not so degraded as to be unreliable. In FIG. 2, the user equipment is described as comparing each of the average levels 204, 205 and 206 of the individual frequency ranges with Q_out. However, the user equipment may compare each of the average levels 204, 205 and 206 of the individual frequency ranges with not only Q_out but also Q_in. More specifically, the user equipment compares the average level of each frequency range with Q_out to check whether radio link quality evaluates to out-of-sync. On the other hand, the user equipment compares the average level of each frequency range with Q_in to check whether radio link quality evaluates to in-sync.

In the present disclosure, the size of a divided frequency range is not limited to a particular value and may be set to one of various values. For example, the size of a frequency range may be set to a suitable one among 6, 15, 25, 50, 75 and 100 resource blocks (RBs) corresponding to 1.4, 3, 5, 10, 15 and 20 MHz channel bandwidths supportable in the LTE system. Here, the resource block is a unit for frequency resource allocation in LTE, is composed of 12 subcarriers, and has a size of 180 kHz.

Figure 3:
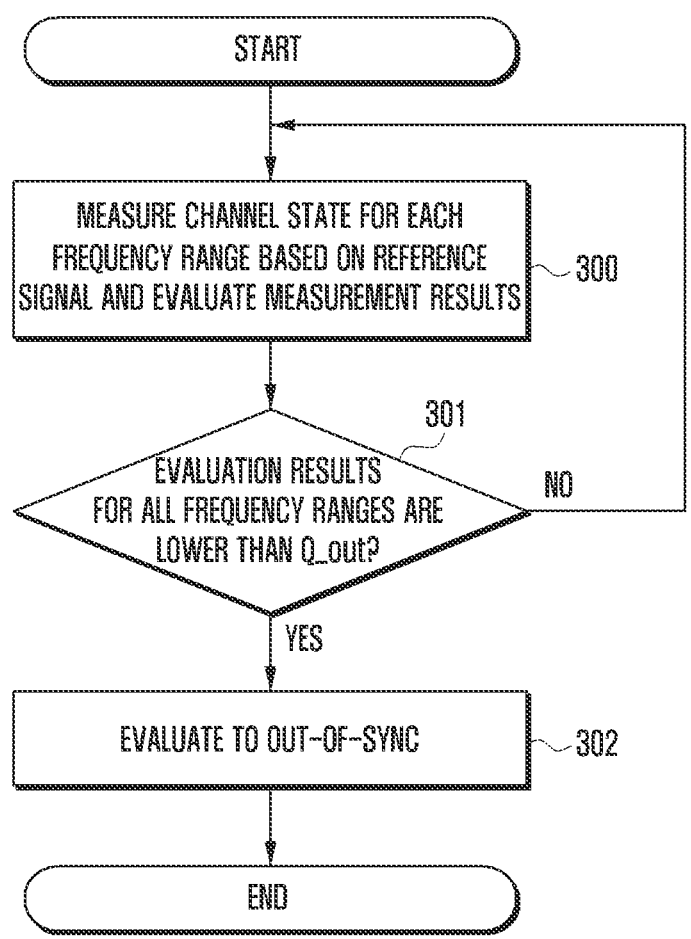
FIG. 3 is a procedure performed by a user equipment to evaluate radio link quality in a wireless communication system according to an embodiment of the present disclosure.

FIG. 3 is a flowchart of a procedure performed by a user equipment to evaluate radio link quality in a wireless communication system according to an embodiment of the present disclosure.

Referring to FIG. 3, at operation 300, the user equipment performs measurement based on the CSI-RS for each configured frequency range and evaluates measurement results. At operation 301, the user equipment checks whether evaluation results for all the frequency ranges are lower than Q_out. If evaluation results for all the frequency ranges are lower than Q_out, the user equipment proceeds to operation 302 at which the user equipment evaluates radio link quality to out-of-sync. This is because, as no frequency range exhibiting a level of quality enabling service reception is present within the downlink channel bandwidth, it is not possible to smoothly provide a service.

If evaluation results for all the frequency ranges are not lower than Q_out, the user equipment returns to operation 300 without evaluating to out-of-sync and continues radio link monitoring. This is because, as at least one frequency range exhibiting a level of quality enabling service reception is present within the downlink channel bandwidth, it is possible to utilize such a frequency range. For example, thereafter, the user equipment may send information on the frequency range exhibiting a level of quality enabling service reception (frequency range quality information) to the base station. Then, the base station may allocate resources to the indicated frequency range, leading to maximum utilization of the frequency domain.

Other evaluation schemes for radio link quality are possible. For example, if at least one frequency range whose evaluation result is lower than Q_out is present, the user equipment may evaluate radio link quality to out-of-sync. Otherwise, the user equipment may continue radio link monitoring without conclusive evaluation.

Figure 4:
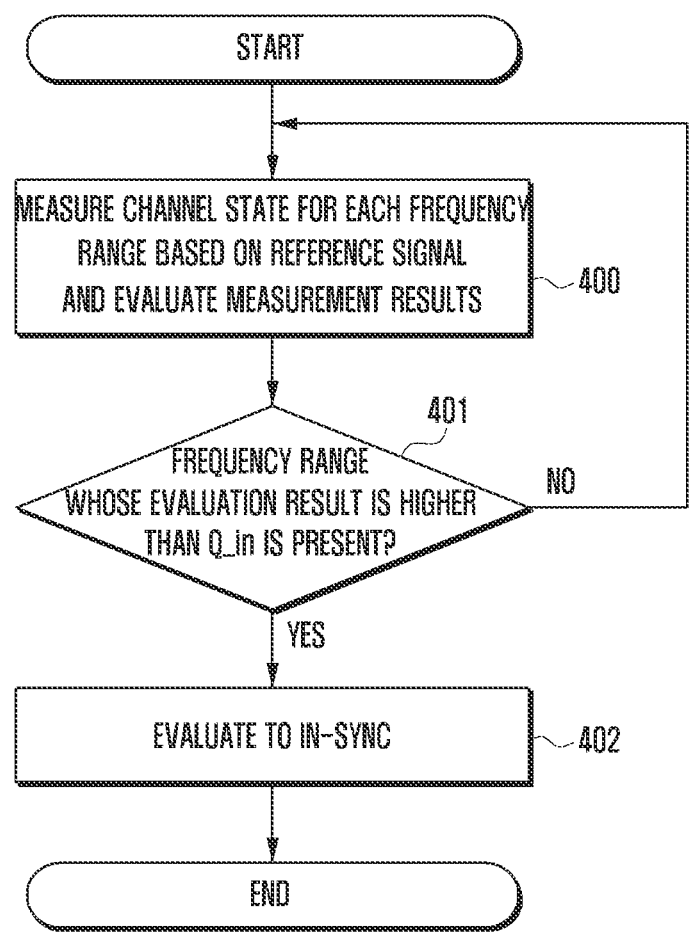
FIG. 4 is another procedure performed by a user equipment to evaluate radio link quality in a wireless communication system according to an embodiment of the present disclosure.

FIG. 4 is a flowchart of another procedure performed by a user equipment to evaluate radio link quality in a wireless communication system according to an embodiment of the present disclosure.

Referring to FIG. 4, at operation 400, the user equipment performs measurement based on the CSI-RS for each configured frequency range and evaluates measurement results. At operation 401, the user equipment checks whether a frequency range whose evaluation result is higher than Q_in is present. If at least one frequency range whose evaluation result is higher than Q_in is present, the user equipment proceeds to operation 402 at which the user equipment evaluates radio link quality to in-sync. That is, when the user equipment is in the physical layer problem detection state, in-sync evaluation by reason of presence of at least one frequency range having been evaluated to normal is advantageous to rapid recovery of the user equipment. If no frequency range whose evaluation result is higher than Q_in is present, the user equipment returns to operation 400 without evaluating to in-sync and continues radio link monitoring.

Other radio link quality evaluation schemes are possible. For example, if evaluation results of all the frequency ranges are higher than Q_in, the user equipment may evaluate radio link quality to in-sync. Otherwise, the user equipment may continue radio link monitoring without conclusive evaluation.

As described above, the user equipment performs radio link quality evaluation based on frequency ranges and obtains quality information for each frequency range accordingly. The user equipment sends frequency range quality information obtained from radio link quality evaluation based on frequency ranges to the base station. Hence, the base station may allocate downlink resources to the frequency range exhibiting a level of quality permitting smooth service reception in the user equipment.

Here, to send frequency range quality information, the user equipment sends a request for uplink resource allocation to the base station. For example, the user equipment may send a scheduling request or random access preamble through the uplink to the base station.

Upon reception of the scheduling request, the base station may send uplink resource allocation information through the downlink to the user equipment. Alternatively, upon reception of the random access preamble, the base station may send a random access response containing uplink resource allocation information to the user equipment. Thereby, the user equipment may send frequency range quality information to the base station through uplink resources allocated by the base station.

In radio link quality evaluation based on frequency ranges, if evaluation results of all the frequency ranges are the same, the user equipment may skip operation for uplink resource allocation. For example, if evaluation results of all the frequency ranges are higher than Q_out, the user equipment may skip transmission of a scheduling request or random access preamble for sending frequency range quality information. This is because, as it is possible to provide a smooth service using downlink resources allocated to any of the frequency ranges, utilizing frequency range quality information will produce very little benefit.

Figure 5:
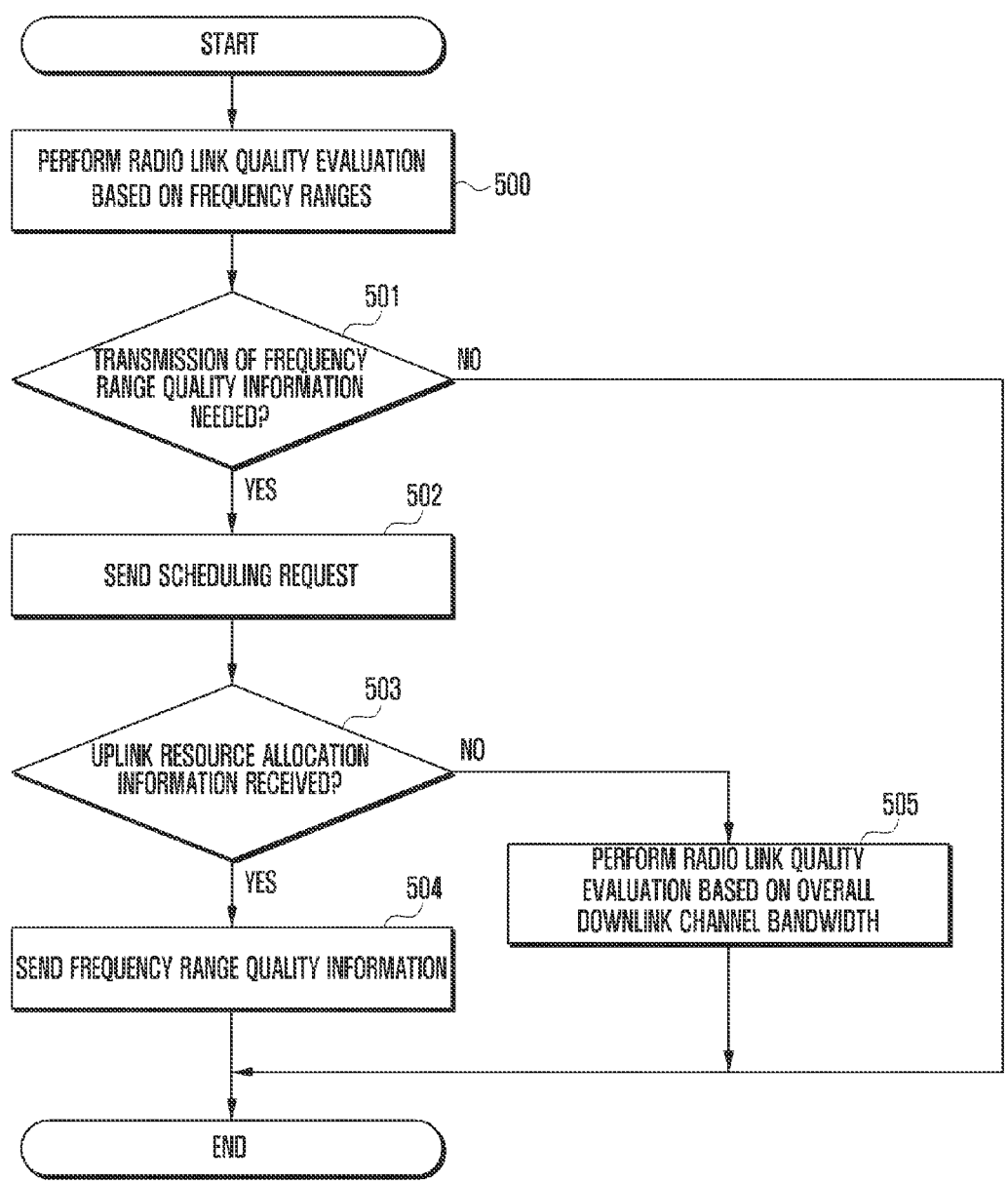
FIG. 5 is a procedure performed by a user equipment to send information on the quality of frequency ranges to a base station in a wireless communication system according to an embodiment of the present disclosure.

FIG. 5 is a flowchart of a procedure performed by a user equipment to send frequency range quality information to a base station in a wireless communication system according to an embodiment of the present disclosure.

Referring to FIG. 5, at operation 500, the user equipment performs radio link quality evaluation based on frequency ranges. At operation 501, the user equipment determines whether transmission of frequency range quality information obtained from operation 500 is needed.

If it is necessary to notify the base station of a frequency range enabling service provisioning because evaluation results of the frequency ranges are different from each other, the user equipment proceeds to operation 502 at which the user equipment sends a scheduling request to the base station. If transmission of frequency range quality information is not needed, the user equipment terminates the procedure.

After sending the scheduling request, at operation 503, the user equipment checks whether uplink resource allocation information is received from the base station. If uplink resource allocation information is received, the user equipment proceeds to operation 504 at which the user equipment sends the frequency range quality information through allocated uplink resources to the base station.

If uplink resource allocation information is not received, the user equipment proceeds to operation 505 at which the user equipment performs radio link quality evaluation based on the overall downlink channel bandwidth (i.e. using the existing scheme not based on frequency ranges). This is because, as the base station fails to receive the scheduling request from the user equipment or the user equipment fails to receive the uplink resource allocation information from the base station, it is not possible to obtain benefits from downlink resource allocation using frequency range quality information. In this case, the existing scheme for radio link quality evaluation based on the overall downlink channel bandwidth may be utilized.

Figure 6:
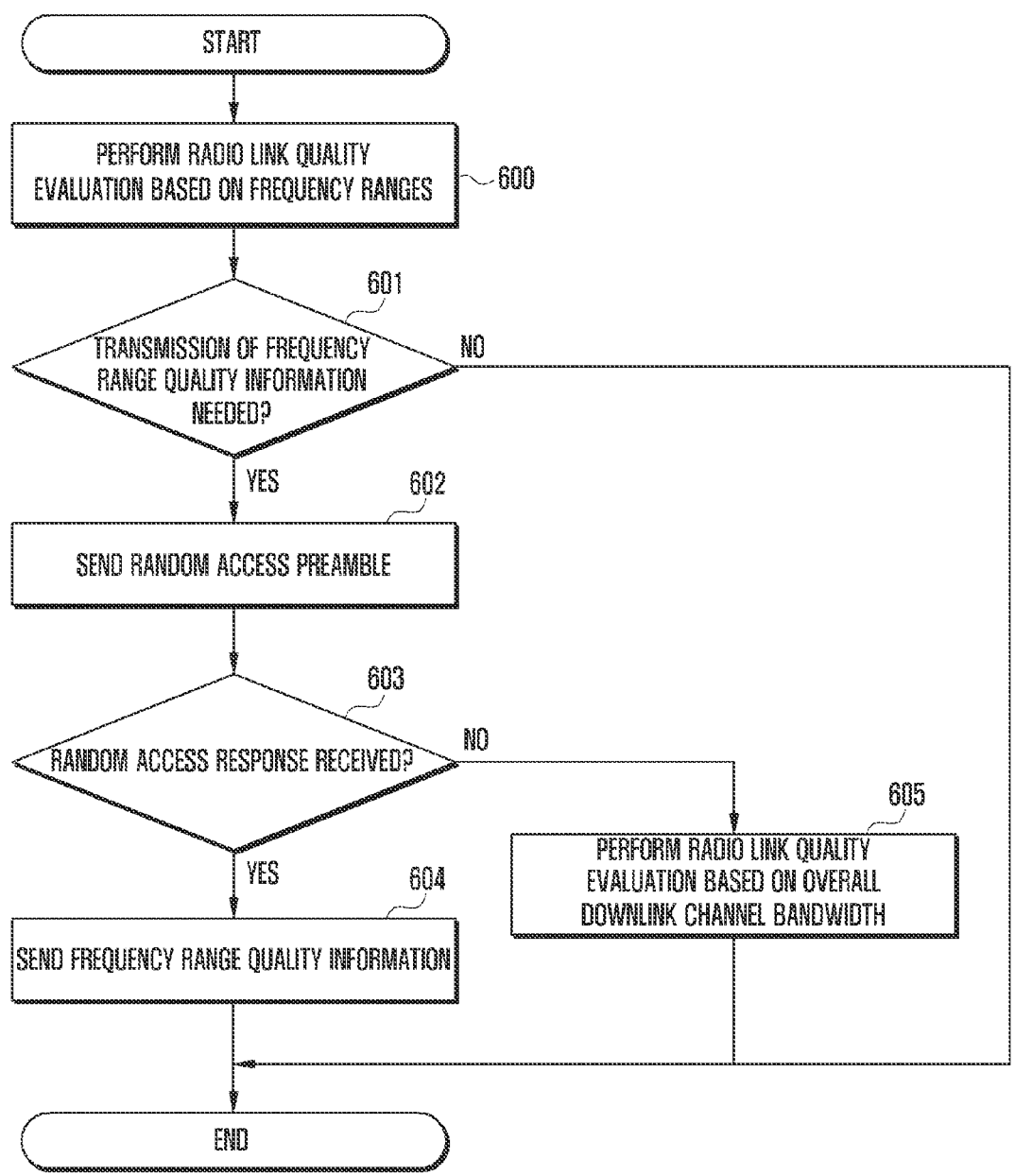
FIG. 6 is another procedure performed by a user equipment to send information on the quality of frequency ranges to a base station in a wireless communication system according to an embodiment of the present disclosure.

FIG. 6 is a flowchart of another procedure performed by a user equipment to send frequency range quality information to a base station in a wireless communication system according to an embodiment of the present disclosure.

Referring to FIG. 6, at operation 600, the user equipment performs radio link quality evaluation based on frequency ranges. At operation 601, the user equipment determines whether transmission of frequency range quality information obtained from operation 600 is needed.

If it is necessary to notify the base station of a frequency range enabling service provisioning because valuation results of the frequency ranges are different from each other, the user equipment proceeds to operation 602 at which the user equipment sends a random access preamble to the base station. If transmission of frequency range quality information is not needed, the user equipment terminates the procedure.

After sending the random access preamble, at operation 603, the user equipment checks whether a random access response is received from the base station. If a random access response is received, the user equipment proceeds to operation 604 at which the user equipment sends the frequency range quality information to the base station through uplink resources allocated according to uplink resource allocation information contained in the random access response.

If a random access response is not received, the user equipment proceeds to operation 605 at which the user equipment performs radio link quality evaluation based on the overall downlink channel bandwidth (i.e. using the existing scheme not based on frequency ranges). This is because, as the base station fails to receive the random access preamble from the user equipment or the user equipment fails to receive the random access response from the base station, it is not possible to obtain benefits from downlink resource allocation using frequency range quality information. In this case, the existing scheme for radio link quality evaluation based on the overall downlink channel bandwidth may be utilized.

Figure 7:
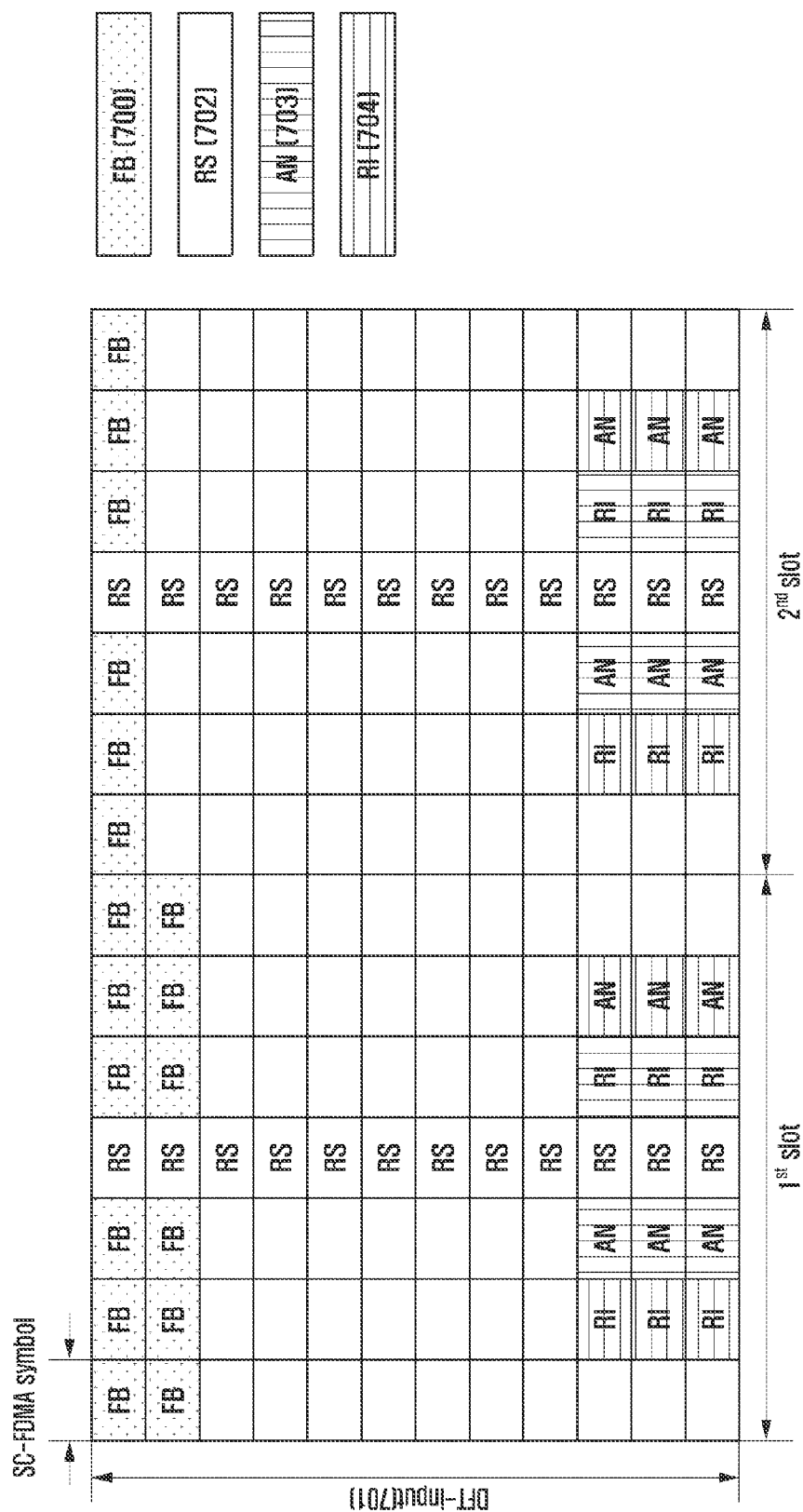
FIG. 7 illustrates a scheme for a user equipment to insert frequency range quality information into the Physical Uplink Shared Channel (PUSCH) in a wireless communication system according to an embodiment of the present disclosure.

FIG. 7 illustrates a scheme for a user equipment to insert frequency range quality information into the Physical Uplink Shared Channel (PUSCH) leading to a base station in a wireless communication system according to an embodiment of the present disclosure.

The PUSCH is a physical channel of the LTE system used by the user equipment to send uplink data. It is specified that uplink channel information such as Channel Quality Indicator (CQI), ACK/NACK (AN) and Rank Indicator (RI) can be inserted together with data into the PUSCH for transmission.

In FIG. 7, the frequency range quality information to be sent from the user equipment to the base station is represented as feedback (FB as indicated by indicia 700), and FB 700 is inserted as a symbol into DFT input 701 for PUSCH transmission. As data can be rate-matched according to the amount of FB 700, the frequency range quality information may be inserted without difficulty.

RS 702 indicates an uplink reference signal that may be used by the base station to perform channel estimation and demodulation at PUSCH reception. An AN 703 indicates a Hybrid Automatic Repeat Request (HARQ) ACK/NACK signal. RI 704 indicates a Rank Indicator denoting rank information for Multiple Input Multiple Output (MIMO) transmission at the base station.

In FIG. 7, frequency range quality information denoted by FB 700 is inserted into the PUSCH together with AN 703 and RI 704. However, only frequency range quality information denoted by FB 700 may be inserted into the PUSCH without AN 703 or RI 704. Frequency range quality information denoted by FB 700 may be inserted into the PUSCH together with either AN 703 or RI 704. No data including frequency range quality information denoted by FB 700 may be present in the PUSCH.

As a different scheme, it is possible to arrange the frequency range quality information close to the uplink reference signal denoted by RS 702 so that the base station may achieve good channel estimation accuracy at reception of the frequency range quality information.

Figure 8:
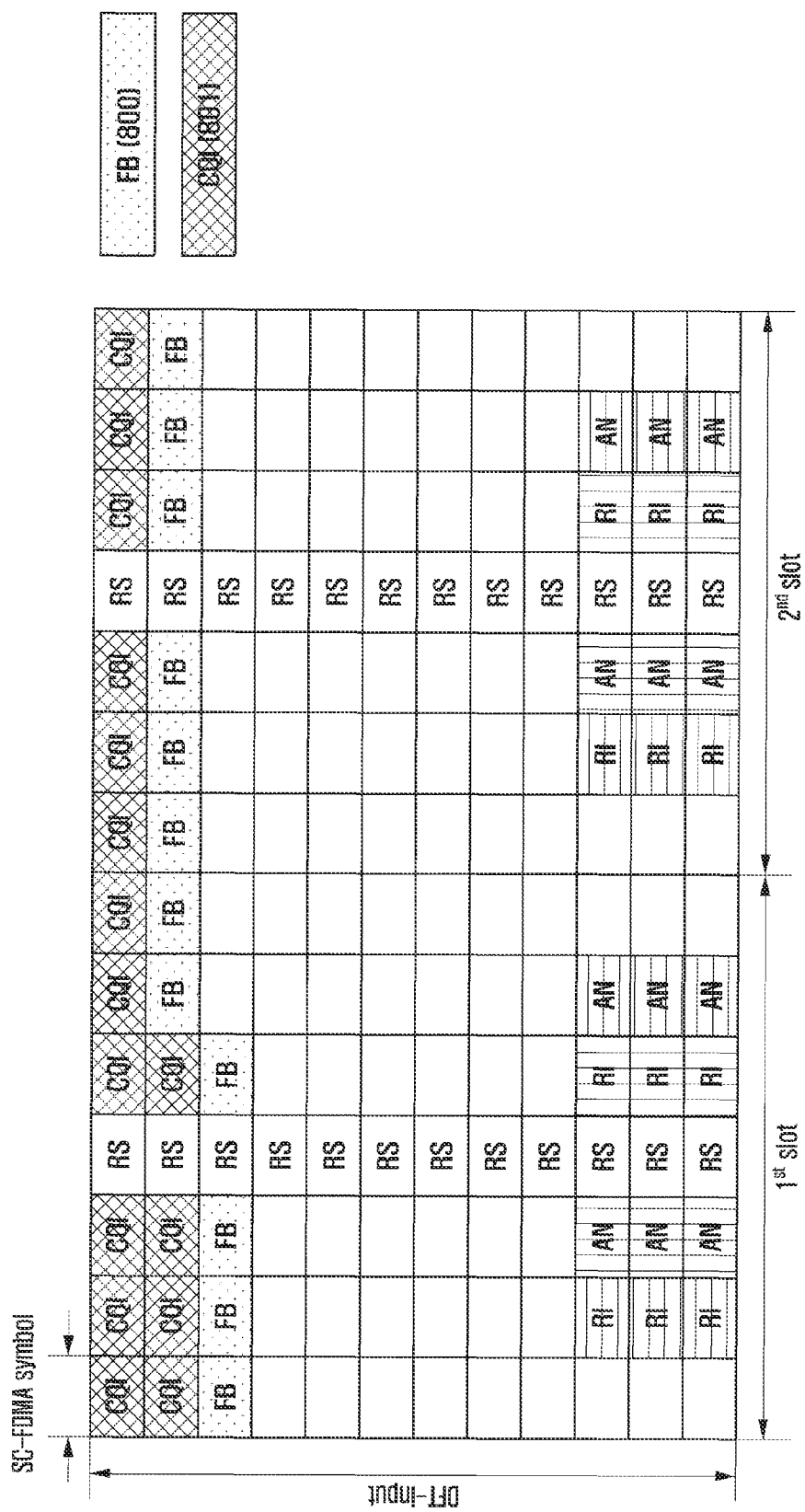
FIG. 8 illustrates another scheme for a user equipment to insert frequency range quality information into the PUSCH in a wireless communication system according to an embodiment of the present disclosure.

FIG. 8 illustrates another scheme for a user equipment to insert frequency range quality information into the PUSCH leading to a base station in a wireless communication system according to an embodiment of the present disclosure.

In FIG. 8, when a Channel Quality Indicator denoted by CQI 801 is present upon insertion of frequency range quality information into the PUSCH, the frequency range quality information denoted by FB 800 is inserted immediately after CQI 801. Alternatively, CQI 801 and frequency range quality information may be joint coded and inserted together.

Figure 9:
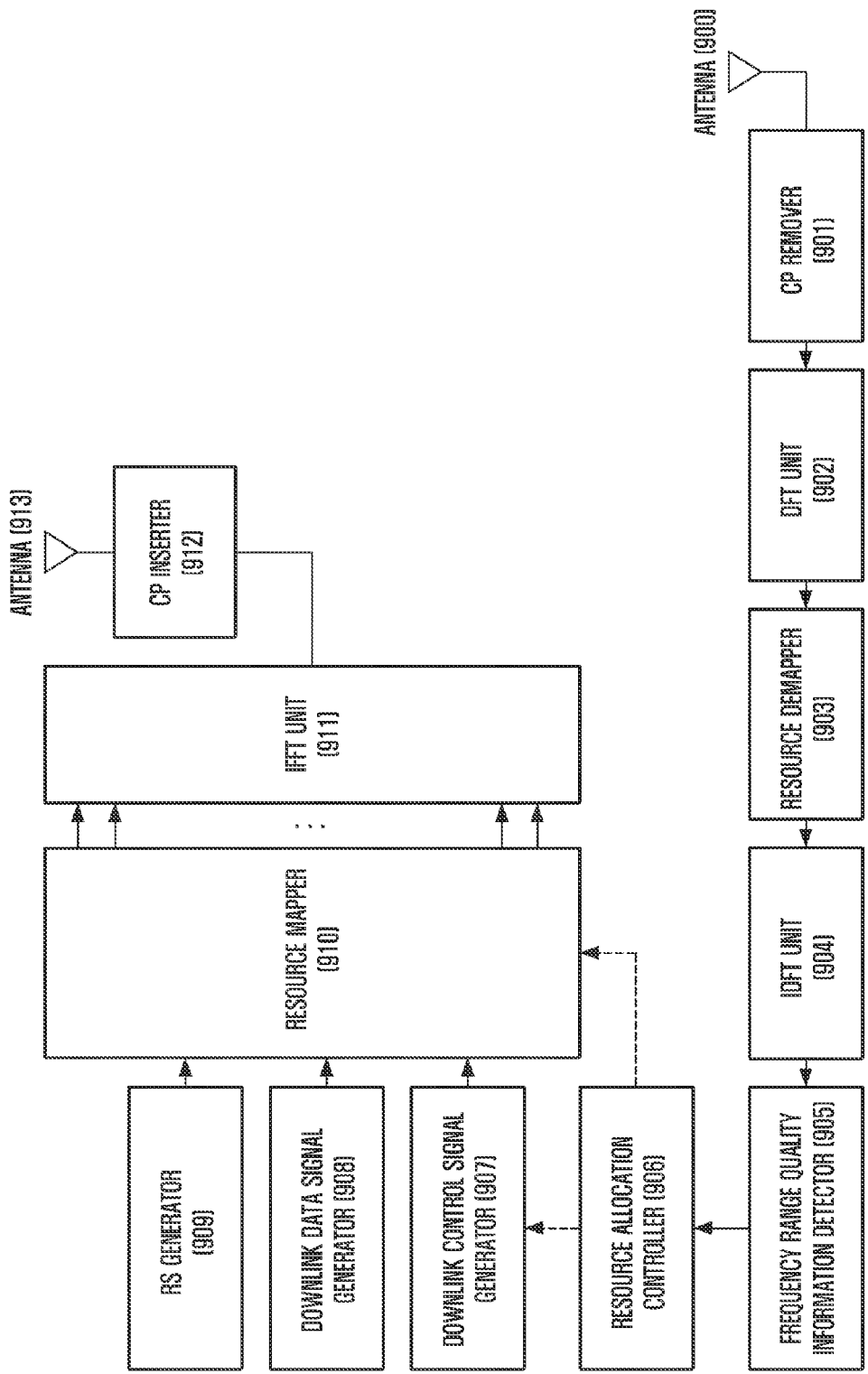
FIG. 9 illustrates a configuration of a base station transceiver device in a wireless communication system according to an embodiment of the present disclosure.

FIG. 9 is a block diagram of a base station transceiver device in a wireless communication system according to an embodiment of the present disclosure.

Referring to FIG. 9, the base station receives a PUSCH transmission containing frequency range quality information from a user equipment through the antenna 900 (or a wireless communication unit). Here, the frequency range quality information is quality information for one or more frequency ranges within the downlink channel bandwidth. Specifically, as described before, the frequency range quality information may include information on at least one frequency range exhibiting a reliable level of quality or information on at least one frequency range exhibiting an unreliable level of quality. Alternatively, the frequency range quality information may include information representing individual quality values of one or more frequency ranges. Here, quality values may be represented as absolute values or as differences with respect to a given reference value.

The received PUSCH is passed through the cyclic prefix (CP) remover 901, DFT unit 902, resource demapper 903, and inverse DFT (IDFT) unit 904, resulting in separation of frequency range quality information from the PUSCH. The frequency range quality information is detected by the frequency range quality information detector 905.

The resource allocation controller 906 performs downlink resource allocation according to the detected frequency range quality information. Downlink signals for the user equipment are generated by the downlink control signal generator 907, the downlink data signal generator 908 and the RS generator 909. A control signal generated by the downlink control signal generator 907 contains resource allocation information determined by the resource allocation controller 906. Generated downlink signals are input to the resource mapper 910 and are mapped to corresponding resources according to resource allocation determination made by the resource allocation controller 906. The output of the resource mapper 910 is passed through the Inverse Fast Fourier Transform (IFFT) unit 911 and the CP inserter 912 and is transmitted through the antenna 913 to the user equipment.

Figure 10:
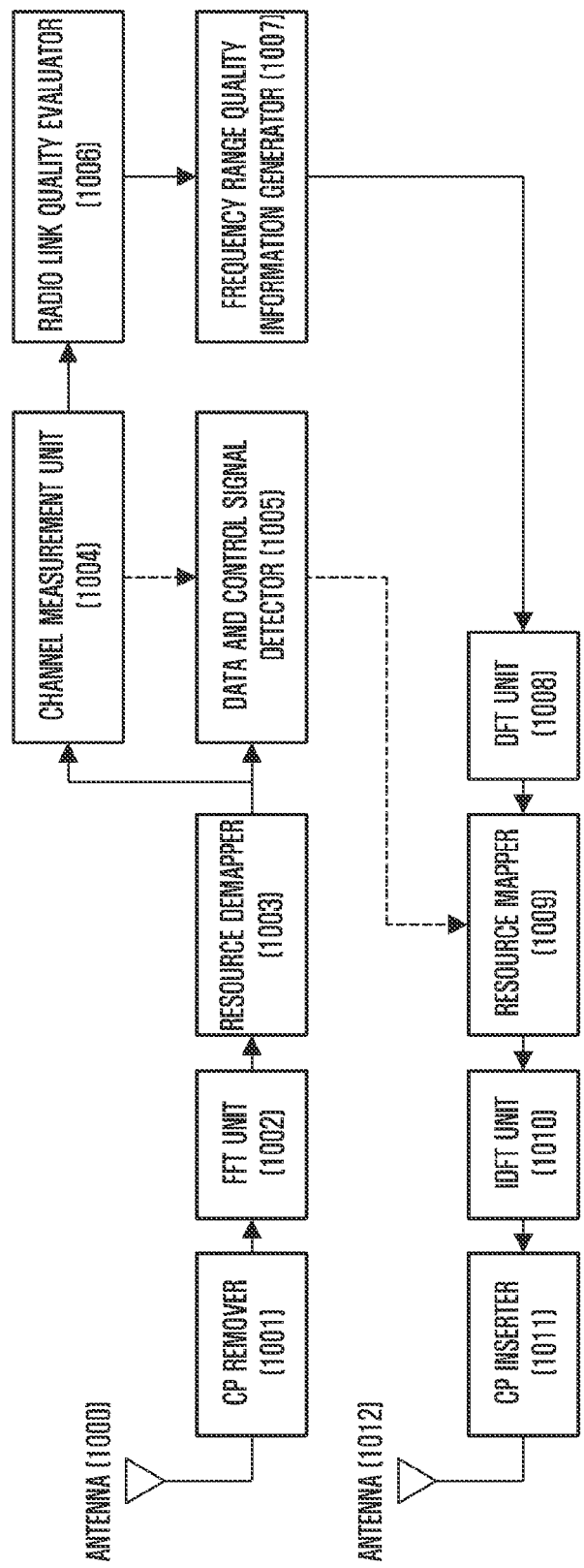
FIG. 10 illustrates a configuration of a terminal transceiver device in a wireless communication system according to an embodiment of the present disclosure.

FIG. 10 is a block diagram of a terminal transceiver device in a wireless communication system according to an embodiment of the present disclosure.

Referring to FIG. 10, the user equipment receives a downlink signal through the antenna 1000 of the transceiver unit (or wireless communication unit). The received downlink signal is passed through the CP remover 1001, FFT unit 1002, and resource demapper 1003 and is separated into a reference signal, data channel, and control channel.

The channel measurement unit 1004 performs downlink channel estimation and channel state measurement on the basis of the reference signal. Channel estimation results are used by the data and control signal detector 1005 to detect data and control channels. Channel state measurement results are used by the radio link quality evaluator 1006 to evaluate radio link quality. In an embodiment, the channel measurement unit 1004 may measure the channel state using the CSI-RS or common reference signal among various reference signals. If quality evaluation results of all the frequency ranges are lower than Q_out (first reference value), the radio link quality evaluator 1006 may evaluate radio link quality to "poor". If at least one frequency range produces a quality evaluation result higher than Q_out, the radio link quality evaluator 1006 does not evaluate radio link quality to "poor" and may continue radio link monitoring.

If at least one frequency range produces a quality evaluation result higher than Q_in (second reference value), the radio link quality evaluator 1006 may evaluate radio link quality to "normal". If quality evaluation results of all the frequency ranges are lower than Q_in, the radio link quality evaluator 1006 does not evaluate radio link quality to "normal" and may continue radio link monitoring.

Radio link quality evaluation indicates necessity of transmitting frequency range quality information to the base station, the frequency range quality information generator 1007 generates frequency range quality information that may be used by the base station for downlink resource allocation.

The frequency range quality information generator 1007 may control a series of operations to send the frequency range quality information to the base station. To this end, the frequency range quality information generator 1007 may control an operation to send an uplink resource allocation request or random access preamble to the base station, and control an operation to send the frequency range quality information to the base station through uplink resources allocated by the base station in response to the uplink resource allocation request or random access preamble. When a response corresponding to the uplink resource allocation request or random access preamble is not received from the base station, the frequency range quality information generator 1007 may control the radio link quality evaluator 1006 to perform radio link quality evaluation based on the overall downlink channel bandwidth.

In an embodiment, when the quality of all the frequency ranges is good or poor, the frequency range quality information generator 1007 may control an operation not to send the frequency range quality information to the base station.

To depict this as a signal flow, the output of the frequency range quality information generator 1007 is fed to the input of the DFT unit 1008 and inserted into the PUSCH. The PUSCH containing the frequency range quality information is mapped by the resource mapper 1009 to corresponding resources according to resource allocation information obtained by the data and control signal detector 1005. The output of the resource mapper 1009 is passed through the IDFT unit 1010 and CP inserter 1011 and is transmitted through the antenna 1012 to the base station.

Figure 11:
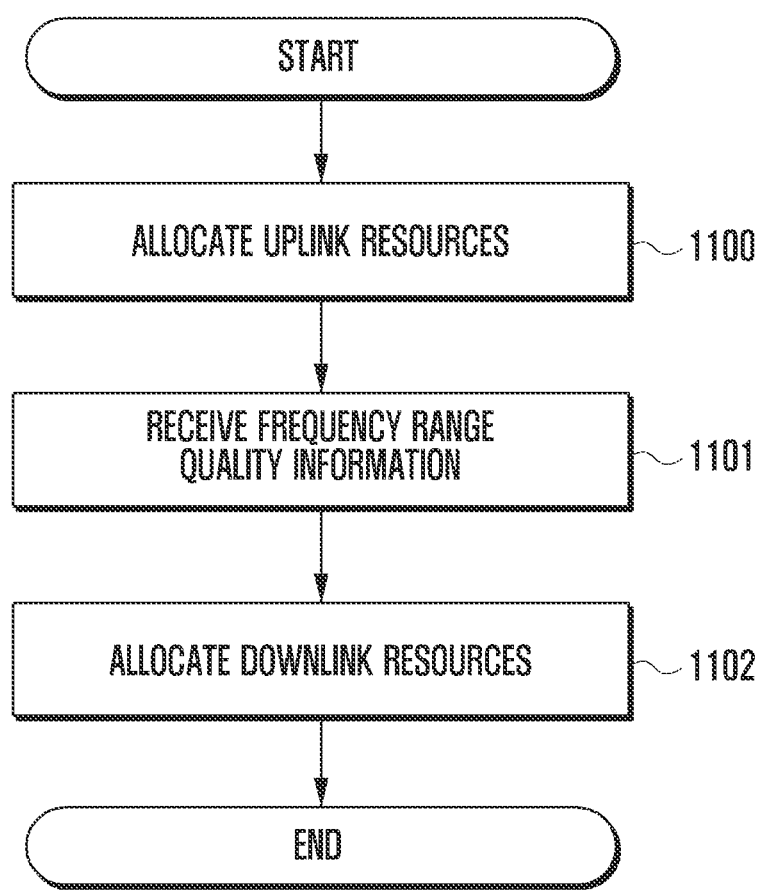
FIG. 11 illustrates an operation procedure performed by a base station in a wireless communication system according to an embodiment of the present disclosure.

FIG. 11 is a flowchart of an operation procedure performed by a base station in a wireless communication system according to an embodiment of the present disclosure.

Referring to FIG. 11, the base station may receive an uplink resource allocation request from a user equipment. As described before, the uplink resource allocation request may be a scheduling request or a random access preamble.

Upon reception of an uplink resource allocation request from the user equipment, at operation 1100, the base station allocates uplink resources to the user equipment. At operation 1101, the base station receives frequency range quality information from the user equipment through the allocated uplink resources. At operation 1102, the base station allocates downlink resources to the user equipment according to the received frequency range quality information. Thereafter, the base station terminates the algorithm of the present disclosure.

Figure 12:
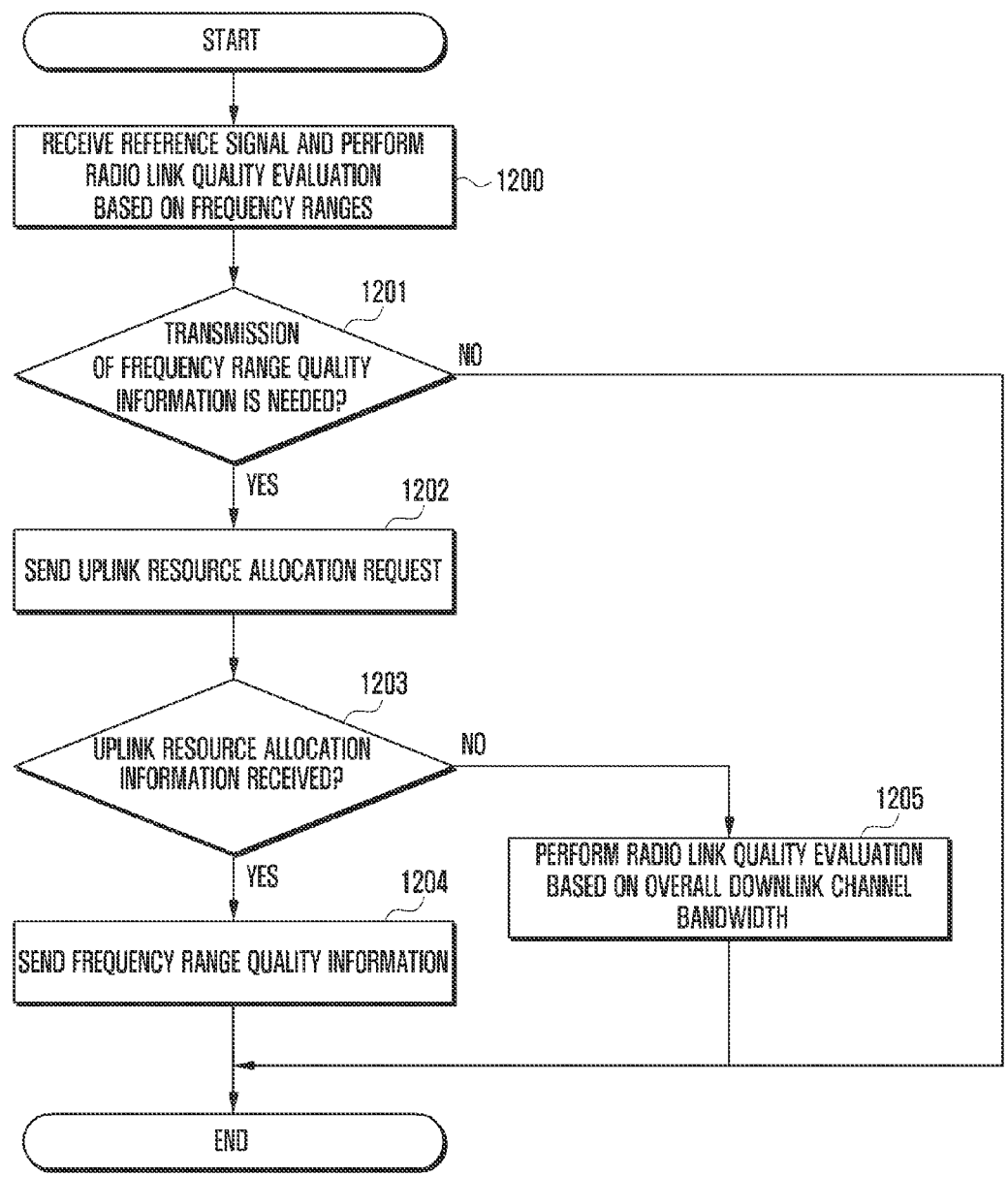
FIG. 12 illustrates an operation procedure performed by a user equipment in a wireless communication system according to an embodiment of the present disclosure.

FIG. 12 is a flowchart of an operation procedure performed by a user equipment in a wireless communication system according to an embodiment of the present disclosure.

Referring to FIG. 12, at operation 1200, the user equipment receives a downlink reference signal from the base station and performs radio link quality evaluation based on frequency ranges on the basis of channel measurement results obtained with respect to the downlink reference signal.

More specifically, performing radio link quality evaluation may include: measuring the channel state for each of one or more frequency ranges divided within the downlink channel bandwidth; evaluating the quality of each frequency range using measurement results; and evaluating radio link quality on the basis of quality evaluation results of the individual frequency ranges.

At operation 1201, the user equipment determines whether transmission of frequency range quality information obtained from operation 1201 is needed. If it is necessary to notify the base station of the frequency range quality information, the user equipment proceeds to operation 1202 at which the user equipment sends an uplink resource allocation request to the base station. As described before, the user equipment may send a scheduling request or random access preamble as an uplink resource allocation request to the base station. If transmission of the frequency range quality information is not needed, the user equipment terminates the algorithm of the present disclosure.

After sending the uplink resource allocation request, at operation 1203, the user equipment checks whether uplink resource allocation information is received from the base station.

If uplink resource allocation information is received, the user equipment proceeds to operation 1204 at which the user equipment sends the frequency range quality information through allocated uplink resources to the base station. If uplink resource allocation information is not received, the user equipment proceeds to operation 1205 at which the user equipment performs radio link quality evaluation based on the overall downlink channel bandwidth (i.e. using the existing scheme not based on frequency ranges). Thereafter, the user equipment terminates the algorithm of the present disclosure.

While the present disclosure has been shown and described with reference to various embodiments thereof, it should be understood by those skilled in the art that many variations and modifications of the method and apparatus described herein will still fall within the spirit and scope of the present disclosure as defined in the appended claims and their equivalents.

The invention claimed is:

1. A method of radio link monitoring for a user equipment in a wireless communication system, the method comprising:
   receiving configuration information for dividing a downlink channel bandwidth into multiple frequency ranges from a corresponding base station;
   dividing the downlink channel bandwidth into the multiple frequency ranges for radio link monitoring;
   measuring channel states for each frequency range; and
   evaluating a radio link quality to in-sync or out-of-sync on the basis of channel state measurement results,
   wherein the evaluating of the radio link quality comprises evaluating, if channel state measurement results for all of the frequency ranges are less than a first reference value, the radio link quality to out-of-sync, and
   wherein a radio link failure is determined based on the evaluated radio link quality.

2. The method of claim 1, wherein the evaluating of the radio link quality comprises evaluating, if at least one of the frequency ranges produces a channel state measurement result for at least one of the frequency ranges is greater than a second reference value, the radio link quality to in-sync.

3. The method of claim 1, further comprising sending quality information for the individual frequency ranges to the corresponding base station.

4. The method of claim 3, wherein the sending of the quality information comprises:
   sending an uplink resource allocation request or a random access preamble to the base station; and
   sending the quality information for the individual frequency ranges to the base station through uplink resources allocated by the base station in response to the uplink resource allocation request or random access preamble.

5. The method of claim 1, wherein the measuring of the channel states comprises measuring channel states for each frequency range by use of a reference signal sent by the corresponding base station.

6. The method of claim 5, wherein the reference signal is a channel state information reference signal (CSI-RS) or a common reference signal.

7. The method of claim 1, wherein the configuration information comprises information on at least one of sizes of frequency ranges, a number of frequency ranges, or positions in frequencies of frequency ranges.

8. A user equipment conducting radio link monitoring in a wireless communication system, comprising:
   a transceiver configured to send and receive signals to and from a base station;
   at least one processor configured to:
      receive configuration information for dividing a downlink channel bandwidth into multiple frequency ranges from the base station,
      divide the downlink channel bandwidth into the multiple frequency ranges for radio link monitoring,
      measure channel states for each frequency range, and
      evaluate a radio link quality to in-sync or out-of-sync on the basis of channel state measurement results,
      wherein the radio link quality is evaluated to out-of-sync if channel state measurement results for all the frequency ranges are less than a first reference value, and
      wherein a radio link failure is determined based on the evaluated radio link quality.

9. The user equipment of claim 8, wherein the radio link quality is evaluated to in-sync if a channel state measurement result for at least one of the frequency ranges is greater than a second reference value.

10. The user equipment of claim 8, wherein the at least one processor is further configured to control transmission of quality information for the individual frequency ranges to the base station.

11. The user equipment of claim 10, wherein the at least one processor is further configured to:
    control a process of sending an uplink resource allocation request or a random access preamble to the base station, and
    send the quality information for the individual frequency ranges to the base station through uplink resources allocated by the base station in response to the uplink resource allocation request or random access preamble.

12. The user equipment of claim 8, wherein the at least one processor is further configured to measure channel states for each frequency range by use of a reference signal sent by the station.

13. The user equipment of claim 12, wherein the reference signal is a channel state information reference signal (CSI-RS) or a common reference signal.

14. The user equipment of claim 8, wherein the configuration information comprises information on at least one of sizes of frequency ranges, a number of frequency ranges, or positions in frequencies of frequency ranges.

* * * * *